United States Patent
Emura et al.

(10) Patent No.: US 7,967,709 B2
(45) Date of Patent: Jun. 28, 2011

(54) BICYCLE SPROCKET

(75) Inventors: Atsuhiro Emura, Sakai (JP); Tetsu Nonoshita, Izumi (JP)

(73) Assignee: Shimano Inc., Osaka (JP)

( * ) Notice: Subject to any disclaimer, the term of this patent is extended or adjusted under 35 U.S.C. 154(b) by 526 days.

(21) Appl. No.: 11/745,770

(22) Filed: May 8, 2007

(65) Prior Publication Data

US 2007/0265122 A1      Nov. 15, 2007

(30) Foreign Application Priority Data

May 12, 2006   (DE) .......................... 10 2006 022 343

(51) Int. Cl.
*F16H 55/30*   (2006.01)

(52) U.S. Cl. ....................................... 474/161; 474/160

(58) Field of Classification Search .................. 474/260, 474/261, 162, 164, 902, 152–153, 155–158, 474/160–161

See application file for complete search history.

(56) References Cited

U.S. PATENT DOCUMENTS

| | | | | | |
|---|---|---|---|---|---|
| 1,181,175 | A | * | 5/1916 | Shapiro | 474/151 |
| 2,720,119 | A | * | 10/1955 | Sherman | 74/460 |
| 3,180,171 | A | * | 4/1965 | Arpin | 74/460 |
| 3,477,303 | A | * | 11/1969 | Brilando | 474/144 |
| 3,990,136 | A | * | 11/1976 | Hishida | 29/893.37 |
| 4,044,621 | A | * | 8/1977 | McGregor et al. | 474/144 |
| 4,078,445 | A | * | 3/1978 | Kiser, Jr. | 474/150 |
| 4,227,422 | A | * | 10/1980 | Kawashima et al. | 474/156 |
| 4,240,303 | A | * | 12/1980 | Mosley | 474/144 |
| 4,261,214 | A | * | 4/1981 | Watanabe et al. | 474/156 |
| 4,278,265 | A | * | 7/1981 | Nagano | 280/160.1 |
| 4,317,388 | A | * | 3/1982 | Wojcikowski | 74/574.2 |
| 4,367,068 | A | * | 1/1983 | Johncox et al. | 474/162 |
| 4,413,981 | A | * | 11/1983 | White et al. | 474/94 |
| 4,589,860 | A | * | 5/1986 | Brandenstein et al. | 474/161 |
| 4,798,565 | A | * | 1/1989 | Boyd | 474/158 |
| 4,867,733 | A | * | 9/1989 | Yamanoi et al. | 474/161 |
| 5,098,346 | A | * | 3/1992 | Redmond | 474/161 |
| 5,224,903 | A | * | 7/1993 | Langhof et al. | 474/152 |
| 5,725,450 | A | * | 3/1998 | Huskey | 474/116 |
| 5,852,951 | A | * | 12/1998 | Santi | 74/443 |
| 5,947,852 | A | * | 9/1999 | Moretz | 474/161 |
| 6,367,300 | B1 | * | 4/2002 | Takamori | 72/71 |
| 6,497,041 | B2 | * | 12/2002 | Fujita et al. | 29/893.35 |
| 6,817,959 | B1 | * | 11/2004 | Blaimschein | 474/152 |

(Continued)

FOREIGN PATENT DOCUMENTS

DE            20218755 U1       2/2003

(Continued)

*Primary Examiner* — Robert Siconolfi
*Assistant Examiner* — Anna Momper
(74) *Attorney, Agent, or Firm* — Global IP Counselors, LLP

(57) ABSTRACT

A bicycle sprocket is provided with a metallic sprocket ring part and a non-metallic inner ring part. The metallic sprocket ring part has a crank facing surface, an opposing surface, an inner periphery and an outer periphery with a plurality of sprocket teeth arranged thereon. The sprocket ring part includes at least one connecting portion integrally formed with the sprocket ring part as a one-piece, unitary member. The non-metallic inner ring part at least partially overlaps the inner periphery of the metallic sprocket ring part to at least partially non-movably couple the non-metallic inner ring part to the metallic sprocket ring part with at least one selected portion being absent of the non-metallic inner ring part to allow relative elastic deformation between the metallic sprocket ring part and the non-metallic inner ring in an axial direction.

15 Claims, 6 Drawing Sheets

U.S. PATENT DOCUMENTS

| | | | |
|---|---|---|---|
| 7,481,729 B2 * | 1/2009 | Andel | 474/162 |
| 2003/0199351 A1 * | 10/2003 | Nichols | 474/160 |
| 2004/0209721 A1 * | 10/2004 | Chattin | 474/160 |
| 2005/0233850 A1 * | 10/2005 | Andel | 474/152 |
| 2006/0205549 A1 * | 9/2006 | Nonoshita et al. | 474/160 |
| 2008/0312016 A1 * | 12/2008 | Chiang et al. | 474/116 |

FOREIGN PATENT DOCUMENTS

| | | |
|---|---|---|
| EP | 1504988 A2 | 2/2005 |
| EP | 1504988 A2 * | 9/2005 |
| EP | 1609714 A2 | 12/2005 |

* cited by examiner

F I G. 6
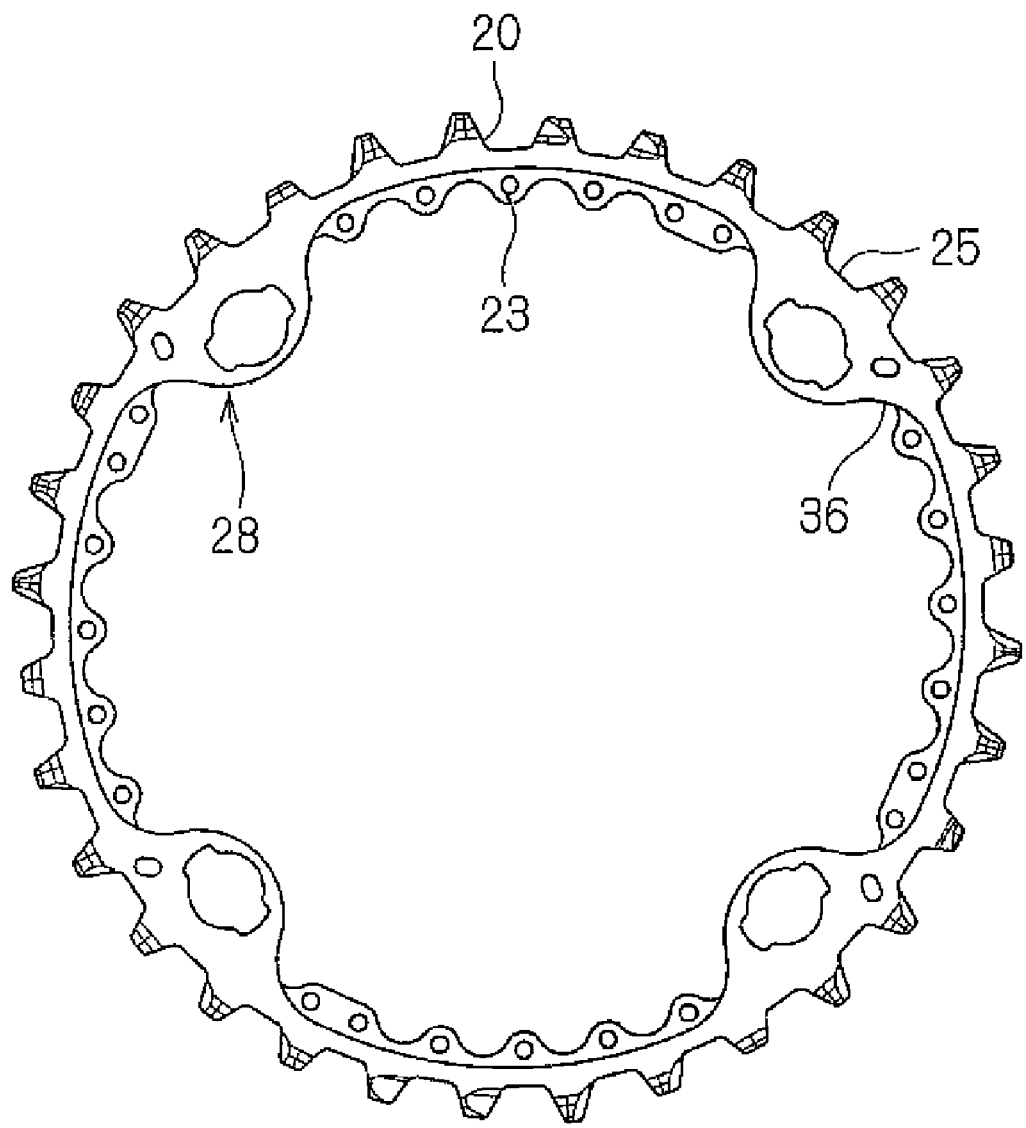

BICYCLE SPROCKET

CROSS-REFERENCE TO RELATED APPLICATIONS

This application claims priority under 35 U.S.C. §119 to German Patent Application No. 10 2006 022 343.8 filed on May 12, 2006. The entire disclosure of German Patent Application No. 10 2006 022 343.8 is hereby incorporated herein by reference.

BACKGROUND OF THE INVENTION

1. Field of the Invention

This invention generally relates to a bicycle sprocket. More specifically, the present invention relates to a bicycle sprocket comprising a metallic element and a non-metallic element, with the bicycle sprocket being configured to be mounted to a rotational drive unit such as a crank of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle sprocket.

A bicycle is generally provided with a drive unit or drive train having one or more front sprockets and one or more rear sprockets with a chain wrapped around the sprockets. The front sprocket(s) is provided on the gear crank of the bicycle and the rear sprocket(s) is provided on the free hub of the bicycle. This type of bicycle sprocket is usually made of materials such as aluminium or iron. When several sprockets are mounted to the gear crank or the free hub in order to provide multiple gears, aluminium is preferably used as the material in order to reduce the weight.

There are also known bicycle sprocket designs to reduce the weight even further by having a sprocket ring part that is made of metal such as aluminium. Such a bicycle sprocket typically includes a sprocket ring part with a plurality of sprocket teeth formed thereon, and a fastening part that is made of non-metallic materials such as carbon fiber material or synthetic resin, attached to the inner circumference of the sprocket ring part and fastened to the gear crank such as, for instance, disclosed in German Utility Model No. 202 18 755 U1.

Further bicycle sprocket devices having a metallic sprocket ring part and a non-metallic inner ring part are disclosed in European Publication No. 1 504 988 and European Publication No. 1 609 714, both aiming to avoid play or looseness as encountered when using a device according to the above mentioned utility model.

The general approach in all of the bicycle sprocket configurations according to the prior art and the most general objective is to save as much weight as possible such that the metallic sprocket ring part is configured to be as small as possible since the non-metallic inner ring part is usually having lighter weight.

Although the bicycle sprockets having a metallic sprocket ring part and a non-metallic inner ring part have proven to be very advantageous in saving weight while still providing sufficient stiffness and rigidity, it has been found that providing a non-movable coupling between those two parts is prone to result in a deterioration of the non-metallic inner ring part when aging and being in constant use. Accordingly, there is a need to improve such bicycle sprocket configuration to avoid the above-mentioned disadvantages.

In view of the above, it will be apparent to those skilled in the art from this disclosure that there exists a need for an improved bicycle sprocket. This invention addresses this need in the art as well as other needs, which will become apparent to those skilled in the art from this disclosure.

SUMMARY OF THE INVENTION

One object of the present invention is to provide a bicycle sprocket configuration to avoid the above-mentioned disadvantages.

The foregoing objects can basically be attained by providing a bicycle sprocket with a metallic sprocket ring part and a non-metallic inner ring part. The metallic sprocket ring part has a crank facing surface, an opposing surface, an inner periphery and an outer periphery with a plurality of sprocket teeth arranged thereon. The sprocket ring part includes at least one connecting portion integrally formed with the sprocket ring part as a one-piece, unitary member. The non-metallic inner ring part at least partially overlaps the inner periphery of the metallic sprocket ring part to at least partially non-movably couple the non-metallic inner ring part to the metallic sprocket ring part with at least one selected portion being absent of the non-metallic inner ring part to allow relative elastic deformation between the metallic sprocket ring part and the non-metallic inner ring in an axial direction.

In full contrast to the prior art and against the general tendency of providing the metallic sprocket ring part as small as possible, it has astonishingly been found out that it is advantageous to provide the above-mentioned bicycle sprocket. Formation of cracks on the non-metallic part is effectively prevented by having at least a portion allowing for relative axial movement. Hence, the invention provides for a bicycle sprocket that allows coupling a crank directly to a metal part while a non-metallic inner ring part is at least partially non-movably coupled to the metallic sprocket ring part providing for a light-weighted complement for various reasons such as for increasing rigidity, aesthetic aspects and improved chain guiding during shift operations.

During riding of a bicycle to which a composite bicycle sprocket is mounted, torque transmitted to the crank is accordingly directly transferred to the metallic sprocket ring part, which could undergo a torsional force resulting in a small relative axial deformation between the metallic sprocket ring part and the non-metallic inner ring in an axial direction due to the fact that metallic material typically has an elastic deformation property. In order to further avoid such formation of cracks in the non-metallic inner ring part, the sprocket ring part and the inner ring part are coupled such that in at least one selected portion at least a small amount of relative axial movement is allowed. Accordingly, by allowing relative axial movement, the elastic deformation between the metallic sprocket ring part and the non-metallic inner ring in an axial direction can take place without resulting in formation of cracks in the non-metallic inner ring part.

According to a preferred embodiment, a selected portion coincides with the connecting portion. In other words, it is preferred to allow relative actual movement in a section where drive torque is exerted on the bicycle sprocket thus providing for an option to cope with such elastic deformations without cracking the non-metallic part of the bicycle sprocket.

In such a configuration where relative axial movement is allowed, it is preferred that the inner ring part is coupled to the sprocket ring part in such a manner as not to overlap with at least the crank surface of the sprocket ring part in the selected portion. Such a configuration allows thus to either have in the selected portion an overlapping on the opposing surface or not to have an overlapping on either lateral surface of the metallic sprocket ring part in the selected portion.

In a preferred embodiment, the inner periphery of such a sprocket ring part has a radial inner surface meeting with a radial outer surface of the inner ring part in a corresponding axial extent of the sprocket ring part such that there is also no gap between the metallic sprocket ring part and the non-metallic inner ring part in a radial direction. Such an arrangement effectively prevents undesirable penetration of e.g., dust, moisture or the like, between the sprocket ring part and the inner ring part.

A particularly preferred embodiment provides for the inner ring part and the sprocket ring part having at least one lateral portion where both parts are flush. Such provision of at least one lateral portion where both parts are substantially flush can provide for a common coupling surface for fixing the crank and allows furthermore an aesthetic pleasant appearance and further allows easy manufacture of the bicycle sprocket since it can be envisaged for instance to mould the non-metallic inner ring part to overlap the metallic sprocket ring part on both lateral side surfaces followed by mechanical working such as grinding the non-metallic inner ring part laterally until the metallic sprocket ring part is reached, so as to provide the flush portion where no overlapping exists any more thus allowing for the relative axial movement.

The inner ring part can be made of any non-metallic material, though it is preferred to have it constructed of a polyamide-based synthetic resin impregnated with a carbon fiber filler. This configuration allows a suitable adherence to the metallic part and provides for suitable rigidity while being light-weighted.

Although the sprocket ring part may be made of aluminum or iron as in the prior art, it is most preferred that the sprocket ring part is constructed of a titanium alloy providing for good rigidity while having reduced weight.

In a particularly preferred embodiment for inexpensive manufacturing, the sprocket ring part is constructed of a die punched metal plate having an annular ring shape with the sprocket teeth formed on the other periphery thereof. Of course, the die punching also provides for the connecting portion being, for instance, formed as radially inwardly projecting and connecting portion having a through hole for receiving a bolt to fix the crank. It is needless to say that the invention also covers other options of building up the metallic part such as molding or other known techniques (e.g., cold forging process).

According to a preferred embodiment, the connecting portion includes at least one integral metallic bent ribbed portion. As an example, the inwardly projecting connecting portion of the sprocket ring part may be configured such as to allow the peripheral edge thereof to be bent in order to form a ribbed portion in that area.

In addition to the above features or as an alternative thereto, the intense study with respect to the non-metallic inner ring part has revealed that it is possible to improve chain handling by providing a specific configuration of the lateral surface of the inner ring part facing a smaller sprocket. This specific configuration of the surface facing a smaller sprocket is regarded to be independently inventive while also representing a preferred embodiment to the before-mentioned ones. The specific configuration of the surface is characterized in comprising at least one chain guiding recess formed on the smaller sprocket facing surface of the inner ring part, the chain guiding recess being in particular a shift operation assisting recess and/or a torsion preventing recess. The shift operation assisting recess can either be a recess assisting upshift from a smaller sprocket to the sprocket according to the invention, or a recess assisting shift operation from the inventive bicycle sprocket to an adjacent smaller sprocket. Additionally or alternatively, the chain guiding recess may be a torsion preventing recess e.g. in case of an extreme setting such as when the large front sprocket is used in conjunction with a very small sprocket on the rear portion of the bicycle.

Further advantages and features of the presents invention will become apparent to the person skilled in the art upon reading the following description of actually preferred embodiments which description is not intended to restrict the scope of the appending claims merely represent examples showing actual mode of carrying out the invention. It should be noted that although in the preferred embodiments a chain guide recess is described in conjunction with a connecting portion integrally formed with the sprocket ring part, together with an allowed axial relative movement of the metallic and the non-metallic part the specific configuration of the lateral side surface of the sprocket is regarded to be inventive as such. In the described embodiment features described in combination could also be provided for separately and it is to be understood that a feature of one described embodiment may be freely substituted with other features described for other embodiments. Furthermore, the configurations as described may be freely altered using the knowledge of the person skilled in the art, for instance, by replacing the described features with equivalent means resulting in the same function.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 6 is an outer side elevational view of a metallic sprocket ring part that is used in a preferred embodiment with a line drawn to represent outer periphery of a non-metallic inner ring part.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
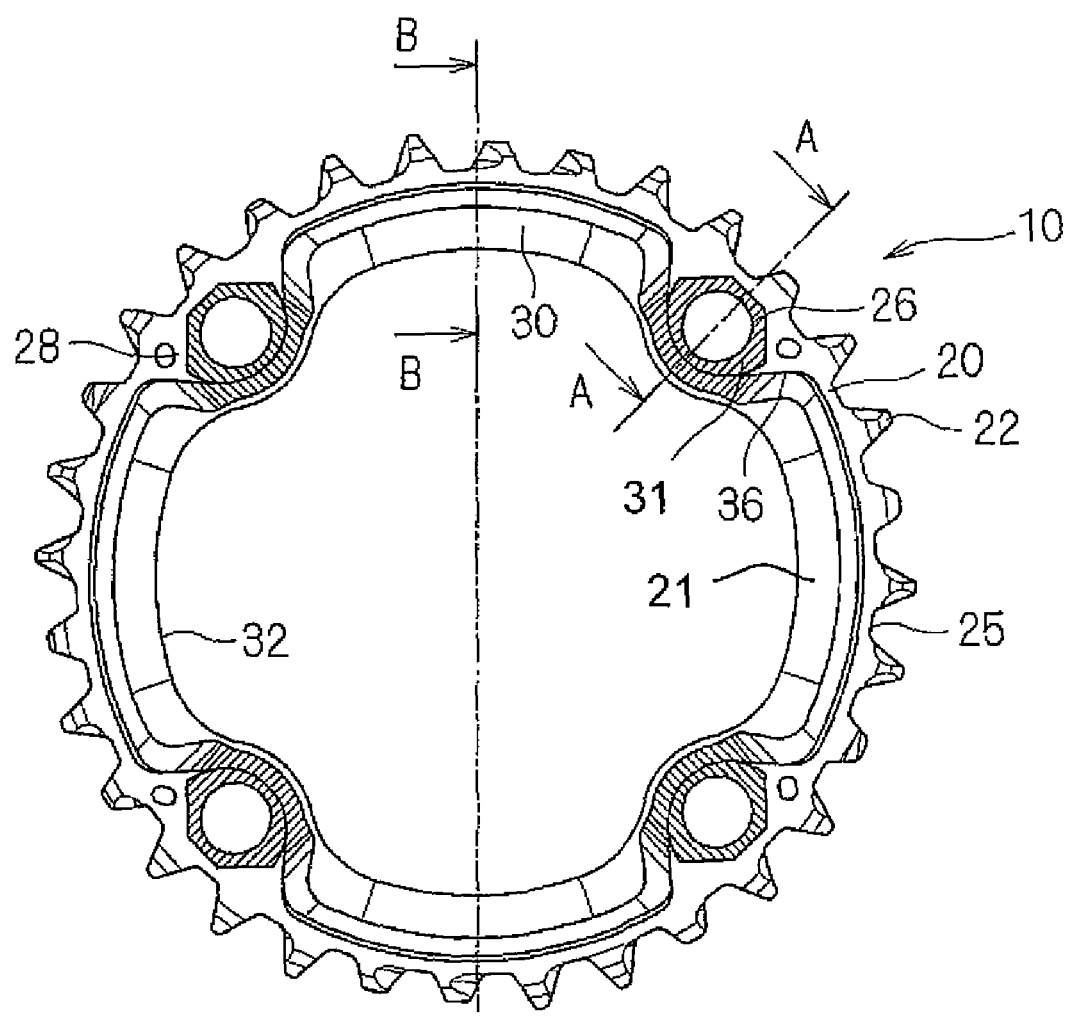
FIG. 1 is an outer side elevational view of a bicycle sprocket according one embodiment of the present invention as viewed from an outer side, i.e., from a side to which a crank can be mounted.

Referring initially to FIG. 1, a bicycle sprocket is illustrated in accordance with a first embodiment of the present invention. In FIG. 1 the bicycle sprocket is viewed from the outer side or side to which a crank is to be mounted. The bicycle sprocket as shown basically includes a metallic sprocket ring part 20 with a plurality of sprocket teeth 22 and a non-metallic inner ring part 30. It is to be noted that the non-metallic inner ring part 30 is represented as being uncolored for illustrative purpose whereas usually the non-metallic inner ring part 30 will be made of a synthetic resin with integrated carbon fibers. Thus, the non-metallic inner ring part 30 is typically colored.

Figure 2:
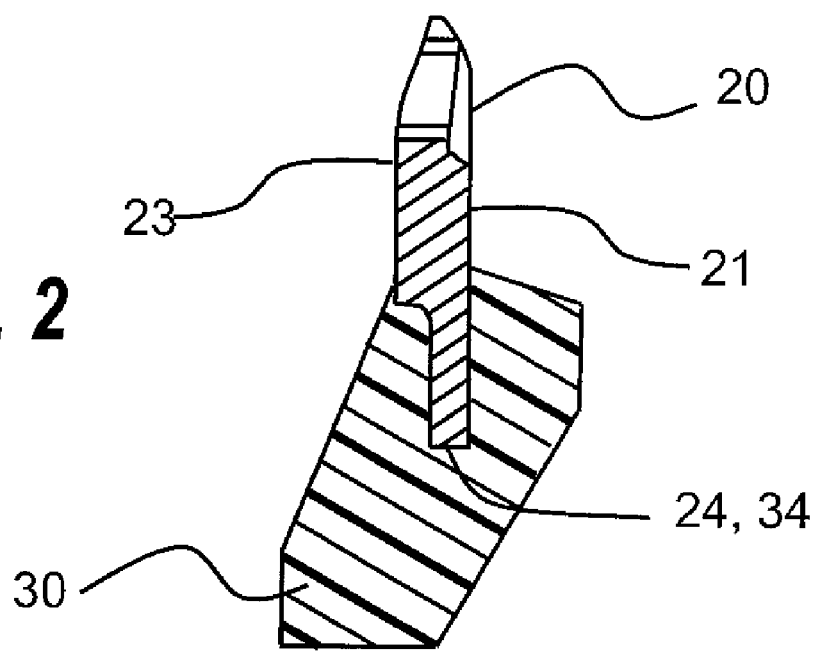
FIG. 2 is a partial cross sectional view of the bicycle sprocket as seen along section B-B of FIG. 1.

As seen in FIG. 2, the metallic sprocket ring part 20 has an inner periphery 24 and an outer periphery 25. The inner periphery 24 is at least partially covered by the non-metallic inner ring part 30. The outer periphery 25 has the sprocket teeth 22 formed thereon for engaging a bicycle chain as it is well known in the art. Preferably, the metallic sprocket ring part 20 includes integrally formed connecting portions 28. The connecting portions 28 form inwardly directed projections that are equally spaced apart in the circumferential direction around the inner periphery 24 of the metallic sprocket ring part 20. In the illustrated embodiment, the metallic sprocket ring part 20 includes four of the connecting portions 28, with each of the connecting portions 28 having a through hole 26 for receiving a bolt or other fixing device to be fixed or coupled to a crank.

The non-metallic inner ring part 30 is preferably located along the entire inner periphery 24 of the metallic sprocket ring part 20. The non-metallic inner ring part 30 is non-movably coupled to the metallic sprocket ring part 20 as will be detailed later. The nonmetallic inner ring part 30 is at least partially overlapping with the inner periphery 24 of the metallic sprocket ring part 20. As illustrated by the dashed portions in the drawings, the metallic sprocket ring part 20 and the non-metallic inner ring part 30 are preferably flush in the zones which are intended to be coupled to a crank arm. In other words, the non-metallic inner ring part 30 does not overlap the facing surface of the metallic sprocket ring part 20 in the shaded areas in FIG. 1. However, the non-metallic inner ring part 30 does overlap the facing surface on the remainder of the metallic sprocket ring part 20. Accordingly, a relative movement of the inwardly projecting portion, being the crank connecting portion 28, is not hindered by an overlapping non-metallic part.

Figure 3:
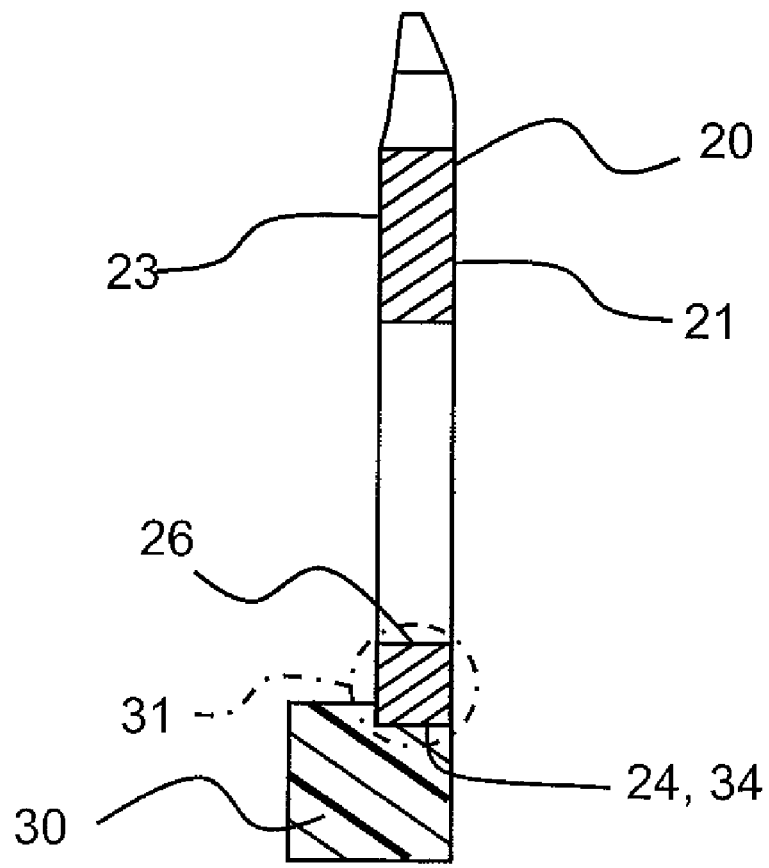
FIG. 3 is a partial cross sectional view of the bicycle sprocket as seen along section A-A of FIG. 1 corresponding to the location of a connecting portion for mounting a crank; t
Figure 4:
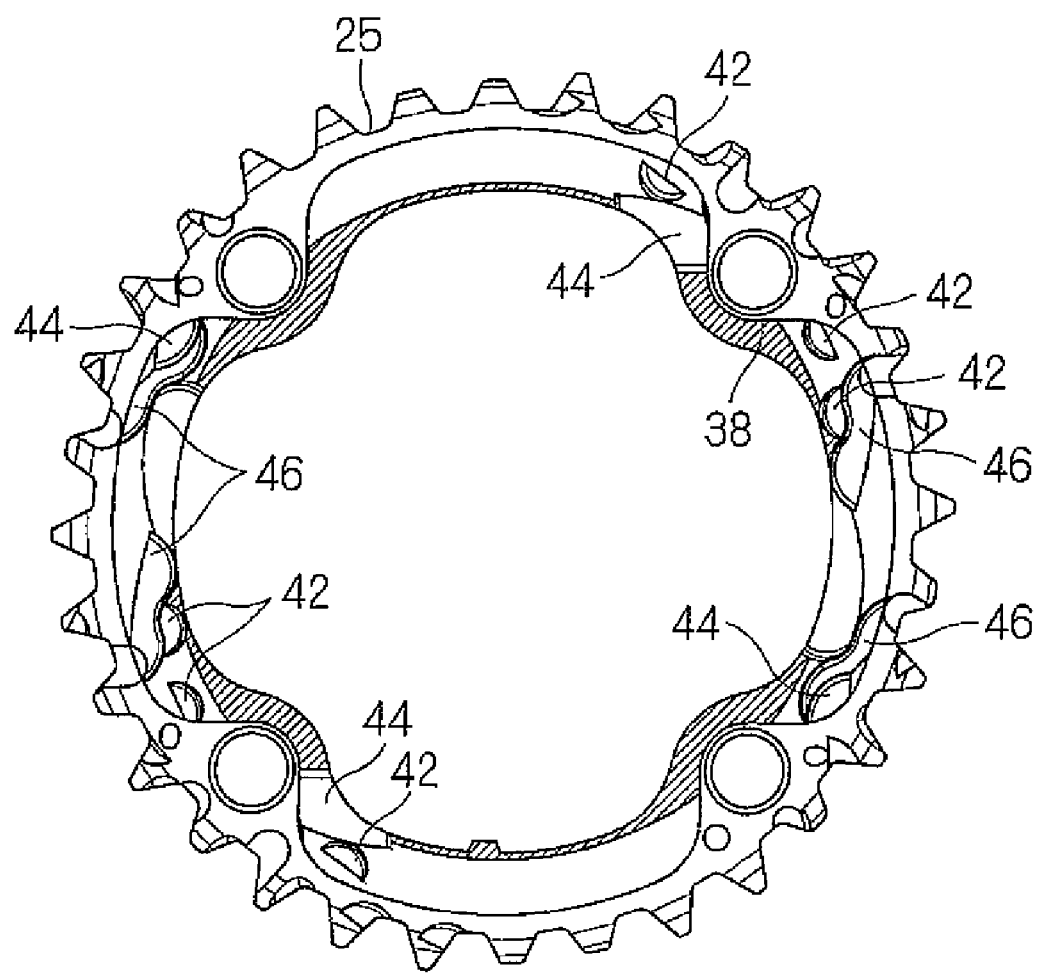
FIG. 4 is an inner side elevational view of the bicycle sprocket shown in FIGS. 1 to 3 from the inner side, i.e., from the side facing a smaller sprocket.

The above configuration can be better realized considering the partial cross sectional views as illustrated in FIGS. 2 and 3 corresponding to the respective cross sections B-B and A-A. As shown in FIG. 2, the metallic sprocket ring part 20 has a crank facing surface 21 and an opposing surface 23. The crank facing surface 21 is the side surface of the sprocket ring part 20, which faces a bicycle crank arm when the bicycle sprocket is assembled with such a bicycle crank arm. Therefore, the crank facing surface 21 can also be regarded as the outer surface of the sprocket ring part 20 since a crank arm is typically mounted to the outer surface of a bicycle sprocket. The opposing surface 23 is the other side surface of the metallic sprocket ring part 20. Accordingly, the opposing surface 21 can also be regarded as the inner surface of the sprocket ring part 20. As illustrated in FIG. 2, the metallic sprocket ring part 20 is embedded into the non-metallic inner ring part 30 to overlap those lateral surfaces 21 and 23 in areas that are not involved in fixation of crank arms. As illustrated in FIGS. 1 and 4, the non-metallic inner ring part 30 has an outer periphery 36 on the outer side, as illustrated in FIG. 1, and an outer periphery 38 on the inner side, as illustrated in FIG. 4.

In contrast thereto, in areas involved in the fixing of crank arms as illustrated in FIG. 3, at least the crank facing surface 21 is void of any overlapping non-metallic material of the non-metallic inner ring part 30, thus allowing for relative axial movement by elastic deformation between the metallic sprocket ring part 20 and the non-metallic inner ring 30 in an axial direction due to elastic deformation of the material forming the metallic sprocket ring part 20. As shown in FIG. 3, in this specific embodiment, the opposing surface 23 is minimally overlapped with the non-metallic inner ring part 30 though it could also be envisaged to have this selected portion 31 to be void of overlapping material on either or both sides. In FIG. 3, it can furthermore be realized that in the selected portion 31, the metallic sprocket ring part 20 and the non-metallic inner ring part 30 are flush at least on the side (the crank facing surface 21) to which the crank is mounted.

FIG. 4 is an illustration of the inner side of the sprocket according to the present invention shown in FIGS. 1 to 3. As illustrated in FIG. 4, the outer periphery 38 of the non-metallic inner ring part 30 extends completely around the inner side the metallic sprocket ring part 20. In other words, the non-metallic inner ring part 30 is continuously located along the entire inner circumference of the metallic sprocket ring part 20. The non-metallic inner ring part 30 has a smaller sprocket facing surface and an opposing surface. The smaller sprocket facing surface is the side surface of the inner ring part 30, which faces another smaller sprocket when the bicycle sprocket is assembled with such a smaller sprocket as a larger sprocket, e.g., a middle or top gear. Therefore, the smaller sprocket facing surface can also be regarded as the inner surface of the inner ring part 30 since a smaller sprocket is typically mounted inwardly from a larger sprocket. The opposing surface of the inner ring part 30 is the other side surface of the inner ring part 30. Accordingly, the opposing surface can also be regarded as the outer surface of the inner ring part 30. The non-metallic inner ring part 30 is configured with a plurality of chain guiding recesses formed on the smaller sprocket facing surface of the inner ring part 30. The surface configuration of the present embodiment comprises three different kinds of chain guiding recesses and it should be noted that a combination of all three kinds of recesses can be provided for as well as a combination of any two of them or even a single one of them. Because such recesses are formed on the non-metallic inner ring part 30, it is possible to quickly and inexpensively form the recesses e.g., by resin-molding process in comparison with forming such recesses on a metallic part of a sprocket.

The chain guide recesses can be classified as one of a torsion preventing recess 42, an up-shifting assisting recess 44 and a down-shifting assisting recesses 46. The torsion preventing recesses 42 are provided on both sides in the vicinity of two coupling or connecting portions 28 in the illustrated embodiment. Those recesses 42 are intended to avoid a gear torsion that could result from excessive angular chain pass. The recesses 42 are provided for at a number of six and are each configured substantially in the form of a half moon in the illustrated embodiment. The up-shifting assisting recesses 44 are also provided adjacent to a respective connecting portion 28 in the illustrated embodiment. Those recesses 44 can be either configured in the shape of a channel portion or in a shape corresponding to a piece of cake and allow for smooth shift operation when the chain passes from an adjacent smaller sprocket to the sprocket of the invention. These recesses 44 are provided in the shown embodiment at a number of four, namely two of each configuration. The downshifting assisting recesses 46 are provided intermittently in pairs between two adjacent connecting portions 28 in the illustrated embodiment. Those recesses 46 are configured in the shape of a channel portion having a wave shaped border so as to fit the shape of a chain in the illustrated embodiment and allow for smooth shift operation when the chain passes from the sprocket of the invention to an adjacent smaller sprocket.

Figure 5:
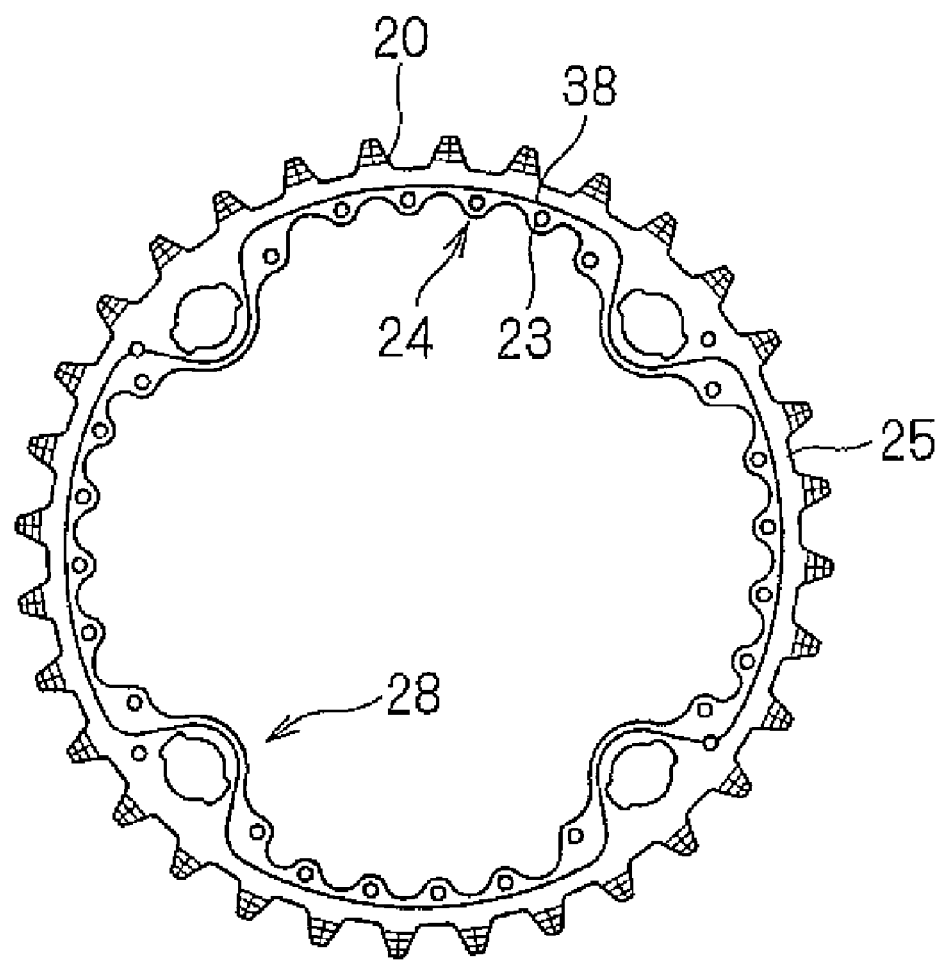
FIG. 5 is an inner side elevational view of a metallic sprocket ring part that is used in a preferred embodiment with a line drawn to represent outer periphery of a non-metallic inner ring part.

FIGS. 5 and 6 respectively show elevational views of the inner side (i.e., the opposing surface 23) and the outer side (i.e., the crank facing surface 21) of the metallic sprocket ring part 20 as used in the embodiment shown in FIGS. 1 to 4. The outer peripheries 36 and 38 of the non-metallic inner ring part 30 are each respectively illustrated in FIGS. 5 and 6 by an annular solid line. It is remembered that the outer side corresponds to the side to which the crank arms are to be mounted whereas the inner side corresponds to the side facing a smaller sprocket as it is well known to the person skilled in the art. As shown in FIGS. 5 and 6, the inner periphery 24 of the metallic sprocket ring part 20 is provided with a plurality of small inwardly directed projections 23. The projections 23 have respectively a through hole for receiving molded material of the non-metallic inner ring part 30. As explained before, the outer periphery of the non-metallic inner ring part 30 is intermittently overlapping and not overlapping the outer lateral side face (i.e., the crank facing surface 21) of the metallic sprocket ring part 20. However, in the shown embodiment, the outer periphery of the non-metallic inner ring part 30 overlaps over the entire circumference on the inner side (i.e., the opposing surface 23). It is to be noted that the outer periphery of the non-metallic inner ring part 30 on the inner side could be configured exactly in the same manner as for the outer side, i.e., the selected portions corresponding to the crank aim mounting portion could be configured to be void of any axially overlapping material thus allowing a small amount of relative axial movement when torque is applied to the crank arms resulting in a small deformation of the metallic sprocket ring part 20, and thus avoiding formation of cracks in the non-metallic inner ring part 30.

Figure 7:
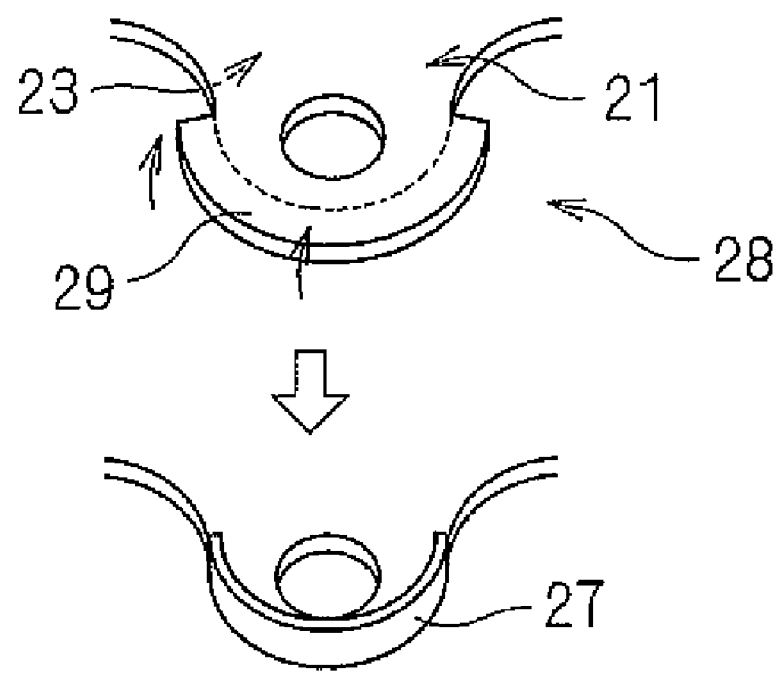
FIG. 7 is a partial exploded perspective view of a connecting portion of the metallic part during a specific manufacturing process that is usable as an alternative to the connecting portion as illustrated in FIGS. 5 and 6.

Finally, FIG. 7 shows an alternative configuration of the connecting portion 28 being integrally formed with the metallic sprocket ring part 20 for increasing rigidity. As illustrated, the connecting portion 28 can be provided with a peripheral edge 29 that can be bent in order to create a ribbed portion 27. Such a ribbed portion 27 functions as an integral metallic reinforcement portion, particularly when the bicycle sprocket is designed such that the non-metallic inner ring part 30 does not overlap with both of the crank facing surface 21 and the opposing surface 23 of the metallic sprocket ring part 20 at the connecting portion 28.

Although preferred embodiments have been described in detail above it is to be noted that various modifications and alterations can be executed by the person skilled in the art without departing from the scope as defined by the appending claims. In full contrast to the prior art the present invention considers connecting portions constructed in the metal part. According to the invention the at least partially non-movable coupling between the metal ring part and the inner ring part is such that in selected portion relative axial movement is allowed, for instance, by providing area void of axial overlapping of the lateral side surfaces or at least one side surface of the metallic sprocket ring part thus resulting in a sprocket that can be configured having suitable rigidity and being capable of sustaining large amounts of torques without any deterioration of the non-metallic inner ring part even when aging. The specific configuration of chain guide recesses of the non-metallic inner ring part, regarded as being inventive as such, allows for smooth shift operation where the chain is shifted up to the inventive sprocket or shifted down from the inventive sprocket while specific chain-guide recesses can also avoid the introduction of torque forces due to improper setting such as occurring when the front sprocket is chosen to be the biggest one while the rear sprocket is chosen to be smallest one. Thus, the foregoing descriptions of the embodiments according to the present invention are provided for illustration only, and not for the purpose of limiting the invention as defined by the appended claims and their equivalents.

What is claimed is:

1. A bicycle sprocket comprising:
a metallic sprocket ring part having a crank facing surface, an opposing surface, an inner periphery and an outer periphery with a plurality of sprocket teeth arranged thereon, the sprocket ring part including at least one connecting portion integrally formed with the sprocket ring part as a one-piece, unitary member, with the at least one connecting portion defining a plurality of fastener receiving holes, each of the fastener receiving holes having a maximum circumferential width extending between first and second circumferential end points with respect to a circumferential direction of the metallic sprocket ring; and
a non-metallic inner ring part at least partially overlapping the inner periphery, the crank facing surface and the opposing surface of the metallic sprocket ring part to at least partially non-movably couple the non-metallic inner ring part to the metallic sprocket ring part with the at least one connecting portion that surrounds the fastener receiving holes being absent of the non-metallic inner ring part to allow relative elastic deformation between the metallic sprocket ring part and the non-metallic inner ring in an axial direction,
the non-metallic inner ring part being disposed radially inward of the fastener receiving holes with respect to an axis of rotation of the bicycle sprocket, the metallic sprocket ring part being entirely free of the non-metallic inner ring part in areas located radially outward of and adjacent to the fastener receiving holes and located in between radically extending lines that extend from the first and second circumferential end points of each of the fastener receiving holes to an outer periphery edge of the metallic sprocket ring part, the non-metallic inner ring part not overlapping at least the crank facing surface at the locations of the fastener receiving holes.

2. The bicycle sprocket as recited in claim 1, wherein the inner periphery of the sprocket ring part has a radial inner surface meeting with a radial outer surface of the inner ring part in a corresponding axial extent of the sprocket ring part.

3. The bicycle sprocket as recited in claim 1, wherein the inner ring part and the sprocket ring part have at least one lateral portion where both parts are flush.

4. The bicycle sprocket as recited in claim 1, wherein the inner ring part is constructed of a polyamide-based synthetic resin impregnated with a carbon fiber filler.

5. The bicycle sprocket as recited in claim 1, wherein the sprocket ring part is constructed of a titanium alloy.

6. The bicycle sprocket as recited in claim 1, wherein the sprocket ring part is constructed of a die punched metal plate having an annular ring shape with the sprocket teeth formed on the other periphery thereof.

7. The bicycle sprocket as recited in claim 1, wherein the connecting portion includes at least one integral metallic bent ribbed portion.

8. A bicycle sprocket comprising:

a metallic sprocket ring part having a crank facing surface, an opposing surface, an inner periphery, and an outer periphery with a plurality of sprocket teeth arranged, the metallic sprocket ring including at least one connecting portion integrally formed with the sprocket ring part as a one-piece unitary member, with the at least one connecting portion defining a plurality of fastener receiving holes, each of the fastener receiving holes having a maximum circumferential width extending between first and second circumferential end points with respect to a circumferential direction of the metallic sprocket ring; and a non-metallic inner ring part at least partially overlapping the inner periphery, the crank facing surface and the opposing surface of the sprocket ring part to at least partially non-movably couple the non-metallic inner ring part to the sprocket ring part with the at least one connecting portion that surrounds the fastener receiving holes being absent of the non-metallic inner ring part to allow relative elastic deformation between the metallic sprocket ring part and the non-metallic inner ring in an axial direction, the non-metallic inner ring part having a smaller sprocket facing surface and an opposing surface, with at least one chain guiding recess formed on the smaller sprocket facing surface of the inner ring part, and the non-metallic inner ring part being disposed radially inward of the fastener receiving holes with respect to an axis of rotation of the bicycle sprocket, the metallic sprocket ring part being entirely free of the non-metallic inner ring part in areas located radially and adjacent to the fastener receiving holes and located in between radically extending lines that extend from the first and second circumferential end points of each of the fastener receiving holes to an outer periphery edge of the metallic sprocket ring part, the non-metallic inner ring part not overlapping at least the crank facing surface at the locations of the fastener receiving holes.

9. The bicycle sprocket as recited in claim 8, wherein the at least one chain guiding recess includes at least one of a shift operation assisting recess and a torsion preventing recess.

10. The bicycle sprocket as recited in claim 9, wherein the inner periphery of the sprocket ring part has a radial inner surface aligned with a radial outer surface of the inner ring part in a corresponding axial extent of the sprocket ring part.

11. The bicycle sprocket as recited in claim 9, wherein the inner ring part and the sprocket ring part have at least one lateral portion where both parts are flush.

12. The bicycle sprocket as recited in claim 9, wherein the inner ring part is constructed of a polyamide-based synthetic resin impregnated with a carbon fiber filler.

13. The bicycle sprocket as recited in claim 9, wherein the sprocket ring part is constructed of a titanium alloy.

14. The bicycle sprocket as recited in claim 9, wherein the sprocket ring part is constructed of a die punched metal plate having an annular ring shape with the sprocket teeth formed on the other periphery thereof.

15. The bicycle sprocket as recited in claim 9, wherein the connecting portion includes at least one integral metallic bent ribbed portion.

* * * * *